US010393881B2

(12) United States Patent
Williams et al.

(10) Patent No.: US 10,393,881 B2
(45) Date of Patent: Aug. 27, 2019

(54) OBTAINING VEHICLE POSITIONS BASED ON POSITIONAL TRIGGER EVENTS

(71) Applicant: GENERAL MOTORS LLC, Detroit, MI (US)

(72) Inventors: Nathaniel H. Williams, Berkley, MI (US); Marco T. Carnevale, Windsor (CA); Michael P. Marchione, New Baltimore, MI (US); Billy L. Holbird, II, Woodhaven, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 182 days.

(21) Appl. No.: 15/482,559

(22) Filed: Apr. 7, 2017

(65) Prior Publication Data

US 2018/0292540 A1 Oct. 11, 2018

(51) Int. Cl.

| | |
|---|---|
| ***G01S 19/42*** | (2010.01) |
| ***G08G 1/0968*** | (2006.01) |
| ***G09B 29/10*** | (2006.01) |
| ***B60W 30/095*** | (2012.01) |
| ***G01C 21/26*** | (2006.01) |
| ***G01C 21/30*** | (2006.01) |
| ***G01C 21/34*** | (2006.01) |
| ***G07B 15/06*** | (2011.01) |
| ***G08G 1/123*** | (2006.01) |
| ***G08G 1/00*** | (2006.01) |
| ***G07C 5/00*** | (2006.01) |
| ***G07C 5/08*** | (2006.01) |
| *G01C 21/36* | (2006.01) |

(52) U.S. Cl.
CPC ........... *G01S 19/42* (2013.01); *B60W 30/095* (2013.01); *G01C 21/26* (2013.01); *G01C 21/30* (2013.01); *G01C 21/34* (2013.01); *G07B 15/063* (2013.01); *G07C 5/008* (2013.01); *G07C 5/085* (2013.01); *G08G 1/096827* (2013.01); *G08G 1/123* (2013.01); *G08G 1/20* (2013.01); *G09B 29/106* (2013.01); *G01C 21/3626* (2013.01)

(58) Field of Classification Search
CPC .......... G01S 19/42; G08G 1/123; G08G 1/20; G09B 29/106
See application file for complete search history.

(56) References Cited

U.S. PATENT DOCUMENTS 5,339,246 A * 8/1994 Kao ..................... G01C 17/38 342/357.37
8,032,276 B2 * 10/2011 Cawse .................. G01C 21/26 340/439

(Continued)

*Primary Examiner* — Anshul Sood
(74) *Attorney, Agent, or Firm* — Reising Ethington P.C.; David Willoughby

(57) ABSTRACT

A system and method to obtain vehicle positional information as it is traveling. The method of generating a vehicle path includes obtaining a first position of a vehicle; monitoring an occurrence of a positional trigger event; after the occurrence of the positional trigger event, obtaining a second position of the vehicle; and transmitting the first and second positions to a storage device wherein the first and second positions form the path. The disclosure also provides for a system to generate the path of the vehicle. The system includes a vehicle system module configured to perform the various steps described herein.

16 Claims, 4 Drawing Sheets

(56) References Cited

U.S. PATENT DOCUMENTS

| | | | | |
|---|---|---|---|---|
| 8,670,928 | B2 * | 3/2014 | Cawse | G01C 21/26<br>340/439 |
| 2017/0228410 | A1 * | 8/2017 | Slusar | G07C 5/008 |
| 2017/0358204 | A1 * | 12/2017 | Modica | G08G 1/0112 |
| 2018/0018835 | A1 * | 1/2018 | Raviv | G07C 5/04 |

* cited by examiner

OBTAINING VEHICLE POSITIONS BASED ON POSITIONAL TRIGGER EVENTS

INTRODUCTION

The present disclosure relates to capturing vehicle positions and, more specifically, to generating a vehicle path based on the captured vehicle positions.

In recent years, advances in technology have led to substantial changes in the design of automotive vehicles. Modern vehicles include an increasing number of electronic components and embedded systems for controlling one or more of the electrical systems or subsystems of the vehicle. The most common include, for example, engine control units, traction control systems, power steering systems, braking systems, climate control systems, navigation systems, and infotainment systems. In particular, navigations systems often rely on global positioning system (GPS) information to accurately determine a vehicle's location.

SUMMARY

According to an aspect of the disclosure, one method of obtaining a path of a vehicle includes (1) obtaining a first position of the vehicle; (2) monitoring an occurrence of a positional trigger event; (3) in response to the occurrence of the positional trigger event, obtaining a second position of the vehicle; and (4) transmitting the first and second positions to a storage device wherein the first and second positions form the path. By way of example, positional trigger events are a change in a vehicle speed, a steering element angular position, and/or a vehicle turn duration. When two or more of these events occur, the method includes obtaining the second position.

Optionally, when the positional trigger event includes the change in the steering element angular position, the change is at least a 5 degree angle. Additionally, when one of the positional trigger events is the change in the steering element angular position, the method optionally includes utilizing vehicle information to convert the detected change in the steering element angular position to a vehicle turn radius.

Optionally, this method includes periodically obtaining additional positions of the vehicle without the occurrence of a positional trigger event, wherein the path includes the additional positions. The method optionally includes (5) retrieving the path from the storage device after the step of transmitting the first and second positions; (6) applying the path to a map; and (7) displaying the path and the map on a vehicle display. The method also optionally includes communicating a message for a vehicle occupant based on the path of the vehicle. In some aspects, the method includes repeating the steps of (1) monitoring an occurrence of a positional trigger event and (2) after the occurrence of the positional trigger event, obtaining a second position to obtain a plurality of second positions of the vehicle, and wherein the path includes the plurality of second positions.

By way of example, the step of obtaining a first position includes the first position being a starting position of the vehicle when an ignition switch of the vehicle is turned on. In another example, the method includes an additional step of obtaining an ending position of the vehicle when the ignition switch is turned off. When the method includes a fleet of vehicles, the step of obtaining a first position includes obtaining a plurality of first positions for respective vehicles in the vehicle fleet, and the step of obtaining a second position includes obtaining a plurality of second positions for the respective vehicles to generate a plurality of paths for the respective vehicles in the vehicle fleet.

Optionally, the step of transmitting the first and second positions includes the storage device being selected from the group consisting of a vehicle storage and a remote storage, and the transmitted path defines a vehicle trip. In one example, the storage device is the remote storage, and the method further includes retrieving the vehicle trip from the remote storage after the step of transmitting the first and second positions. In another example, the storage device is the vehicle storage, and the method further includes transmitting the path from the vehicle storage to remote storage after the step of transmitting the first and second positions.

To assist in generating a real-time path, the step of transmitting the first and second positions to a storage device includes (1) transmitting the first position to remote storage after the step of obtaining a first position and before the step of obtaining a second position and (2) transmitting the second position to the remote storage after the step of obtaining a second position. In this example, optionally, the method further includes displaying the path on a vehicle display, the path being in real-time. To generate a real-time path on a remote device, the step of transmitting the first and second positions to a storage device includes (1) transmitting the first position or a first signal to obtain the first position to a remote device for display on the remote device after the step of obtaining a first position and before the step of obtaining a second position and (2) transmitting the second position or a second signal to obtain the second position to the remote device for display on the remote device after the step of obtaining a second position. Any and/or all of the above described method steps are carried out or performed by a vehicle system.

According to another aspect of the disclosure, a system for obtaining a path of a vehicle includes a vehicle system module that (1) obtains a first position of the vehicle; (2) monitors an occurrence of a positional trigger event; (3) in response to the occurrence of the positional trigger event, obtains a second position of the vehicle; and (4) transmits the first and second positions to a storage device, wherein the first and second positions form the path. By way of example, the vehicle system module includes a steering module configured or adapted to generate the positional trigger event and a global positioning system module configured to obtain the first and second positions of the vehicle. Optionally, the vehicle system module is part of the above-described vehicle system, and can carry out any of the steps described herein.

According to yet another aspect of the disclosure, a system for obtaining a path of a vehicle includes a vehicle system module that (1) obtains a first position of the vehicle; (2) transmits the first position or a first signal to obtain the first position to a remote device for display on the remote device; (3) monitors an occurrence of a positional trigger event; (4) in response to the occurrence of the positional trigger event, obtains a second position of the vehicle; and (5) transmits the second position or a second signal to obtain the second position to the remote device for display on the remote device, wherein the first and second positions form the path. In one example, the remote device is a cellular telephone.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

The system and method(s) described herein relate to obtaining various vehicle positions and, more specifically, to generating a vehicle path based on the obtained vehicle positions. Obtaining accurate positional information regarding the location of an object (e.g., a vehicle traveling on a road) is important for a variety of reasons. For example, users attempting to access a vehicle's traveled trips or routes at a later date will have access to accurate data that reflects the actual path taken. Further, for real-time navigation, the path is routinely updated with accurate information as the object travels. While aspects of this disclosure will be described using an exemplary vehicle, it will be understood that these systems and methods apply to any objects capable of traveling or being taken on a path (e.gs., motorcycles, bicycles, various motorized objects, electronic devices, and the like).

Figure 1:
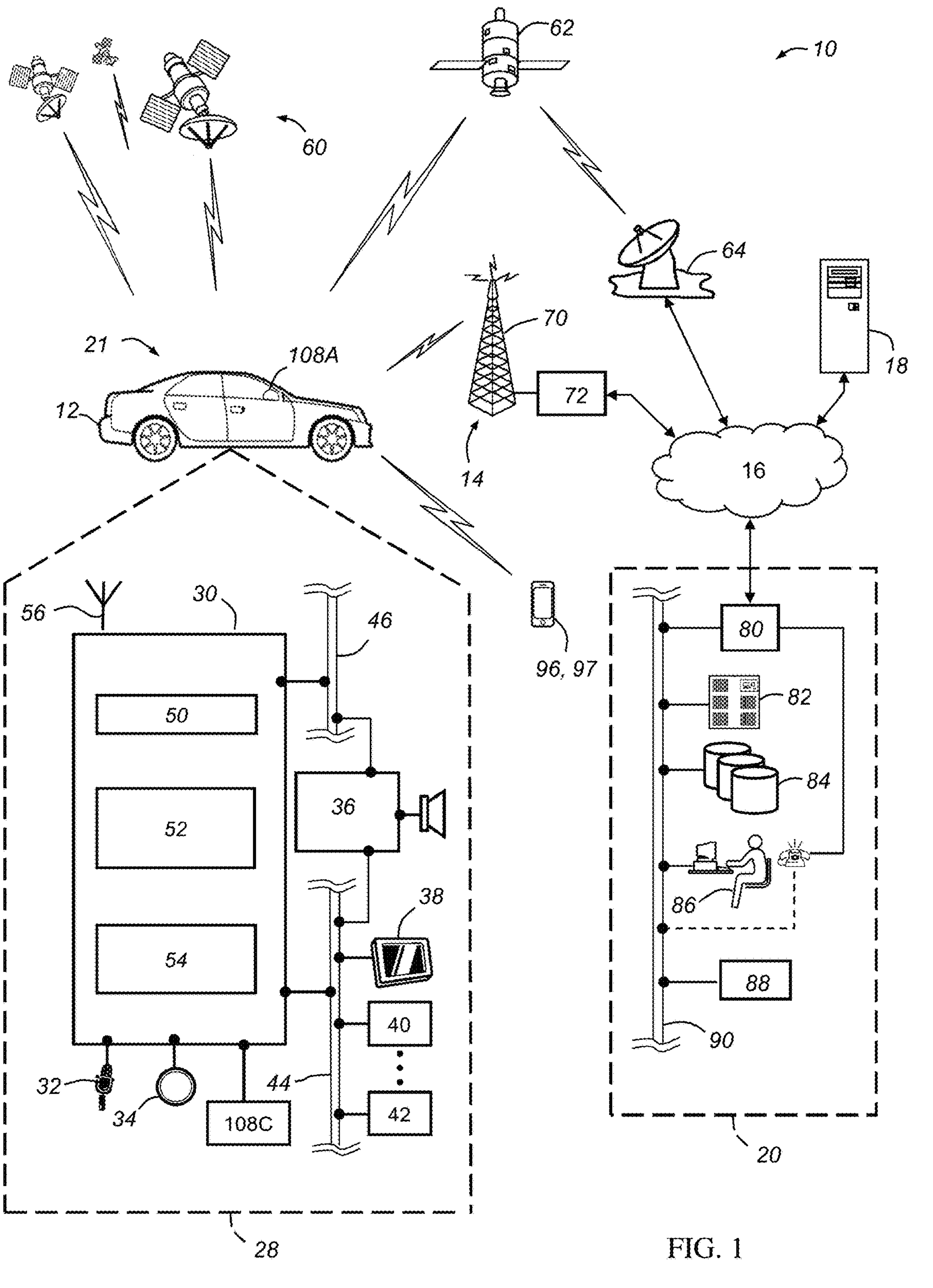
FIG. 1 shows a block diagram depicting a communications system that is capable of utilizing the method(s) described herein, according to an exemplary embodiment.

With reference to FIG. 1, there is shown an operating environment that comprises a mobile vehicle communications system 10 and that can be used to implement the method(s) disclosed herein. Communications system 10 generally includes a vehicle 12, one or more wireless carrier systems 14, a land communications network 16, a computer 18, and a call center 20. It should be understood that the disclosed method(s) can be used with any number of different systems and are not specifically limited to the operating environment shown here. The following paragraphs provide a brief overview of one such communications system 10; however, other systems not shown here could employ the disclosed method(s) as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Depending on what type of vehicle, vehicle 12 will be equipped with various vehicle information 21, which includes the make and model, type and sizing of vehicle components, fuel efficiency, maintenance information, and the like. Vehicle 12 accommodates vehicle occupants inside its cab, which can be a driver or passengers. Additionally, vehicle 12 has various hardware components, including a steering element 108A controlled by a steering module 108C, an ignition switch, electronics 28, and the like. Several of these vehicle components will be discussed in further detail below.

Some of the vehicle electronics 28 are shown generally in FIG. 1 and include a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30. These capabilities will be discussed in further detail below.

Additionally, steering module 108C is coupled to the steering column and the steering element 108A. Steering module 108C can monitor and determine various positions of the steering element. For example, by way of various sensors, this module determines and/or senses the angular position of the steering element 108A, and can send and receive this information on the various vehicle communication components discussed herein. This angular position data can be used to accurately determine the vehicle's location, particularly in combination with GPS data.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system.

According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, positional data, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

In addition to the call center 20, the vehicle electronics 28 communicates with remote devices, such as cellular telephone 96. Cell phone 96 can be a third party device or provided as part of the vehicle 12. Cell phone 96 has battery 97, which may be charged by the vehicle 12. In order to conserve battery life, vehicle 12's electronic systems can collect and transmit information to cell phone 96 so that cell phone 96 displays this information. Further cooperative functions between vehicle electronics 28 and cell phone 96 will be discussed below. It will be appreciated that various remote devices, such as computers, tablets, other vehicles, processors, displays, and the like, can communicate with vehicle electronics 28 in the same manner as exemplary cell phone 96.

Figure 2:
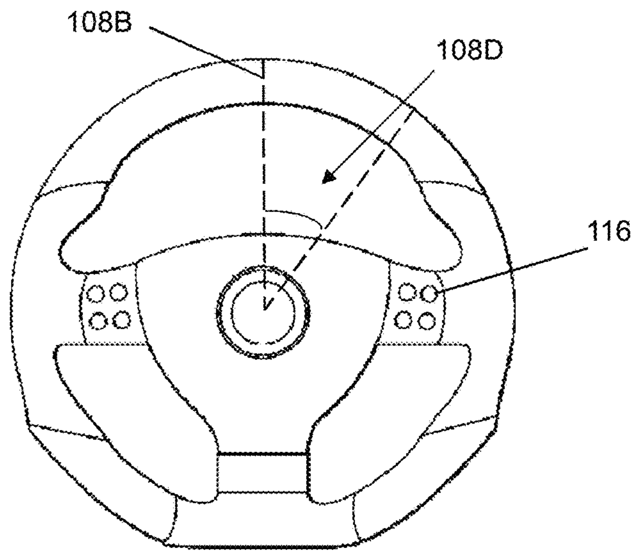
FIG. 2 depicts a steering wheel of a vehicle, according to an exemplary embodiment.

FIG. 2 depicts further details of the steering element 108A. Steering element 108A, depicted as a wheel, rotates around a steering axis such that steering element 108A has a default angular position 108B wherein the top, center of the wheel is located upright, at a 12 o'clock position. As the steering element 108A is rotated clockwise to a rotated position (depicted with a dashed line in FIG. 2), various steering element sensors (e.g., 116) detect the angle or degree of rotation 108D. The change in the steering element's angular position, or degree of rotation 108D, can be a "positional trigger event" or part of a positional trigger event which triggers the vehicle's system to obtain a position of the vehicle.

A variety of different conditions may lead to a positional trigger event. For example, such trigger events may include a change in two or more vehicle parameters selected from the group consisting of a vehicle speed, a steering element angular position, and a vehicle turn duration. These parameters relate to angular displacement of the steering element and/or the vehicle itself. Parameters related to angular displacement can provide the most accurate position information because they change at a critical time when the vehicle is experiencing a significant directional change. More specifically, as the vehicle changes its speed and/or velocity, this can signal to the vehicle's monitoring system that the vehicle is changing its position to a sufficient degree or threshold so that the vehicle's position is obtained. Usually, a change in speed or velocity alone is not sufficient to trigger a collection point. Instead, a change in speed, coupled with either a change in steering element angular position and/or the duration of the vehicle's turn indicates a significant change in the vehicle position so that the system obtains the position.

Additionally, acceleration, compass information and/or lane detection software can lead to one or more positional trigger events. In one example, if the lane detection software indicates that the vehicle has moved out of its original lane to a sufficient degree or threshold, this movement may indicate a change in position that triggers obtaining a vehicle position. Acceleration could be measured by an accelerometer in the vehicle system.

Each positional trigger event may have a "threshold." Below the threshold, the positional trigger event is not significant enough for the system to obtain the vehicle's position. However, above the threshold, the trigger event is significant. For example, when the change in the steering element angular position, or degree of rotation 108D, is at least a 5 degree angle, a threshold is met and the system takes a vehicle position. In other words, a change in steering element angular position below 5 degrees does not indicate that the vehicle has experienced a significant trigger event. However, equal to or above 5 degrees is significant. In some cases, the particular degree of rotation also depends on the vehicle's speed. At low speeds, the degree of rotation needed to satisfy the threshold may be higher (e.g., 30 degrees). However, at high speeds in a highway or freeway, the threshold may only be 5 degrees. Vehicle speed may also have a threshold. A small change in speed may not be significant, but a change in vehicle speed of 20 miles per hour may be significant to trigger a collection point of the vehicle's position.

The duration of an angular change in steering element may also be used as a part of determining that a positional trigger event has occurred. For example, an angular change of a certain degree (e.g., 5-15 degrees) for a short duration (e.g., <3 seconds) may indicate a lane change, whereas the same or larger angular change for a longer duration may indicate a curve in the road or a turn onto another road. Vehicle speed may also be used in conjunction with angle and duration to determine the type of positional change occurring. One or more of these different event types (lane change, curve in road, turn onto new road) may be used as a positional trigger event that causes the collection of a positional data point from the GPS or other source of location information.

Additionally, the system can use vehicle information (FIG. 1 (21), e.g., make and model) to convert the detected change in the steering element angular position, or degree of rotation 108D, to a vehicle turn radius to determine how far the vehicle will turn based on the degree of rotation of the steering element. Depending on the specific vehicle, the severity or degree of a steering element rotation does not equal, on a ratio of 1:1, the degree the vehicle will turn on the path. By calculating the exact degree the vehicle will turn, the vehicle information assists in depicting the vehicle's path. In some aspects, the vehicle turn radius is also utilized to accurately depict a vehicle path.

Figure 3:
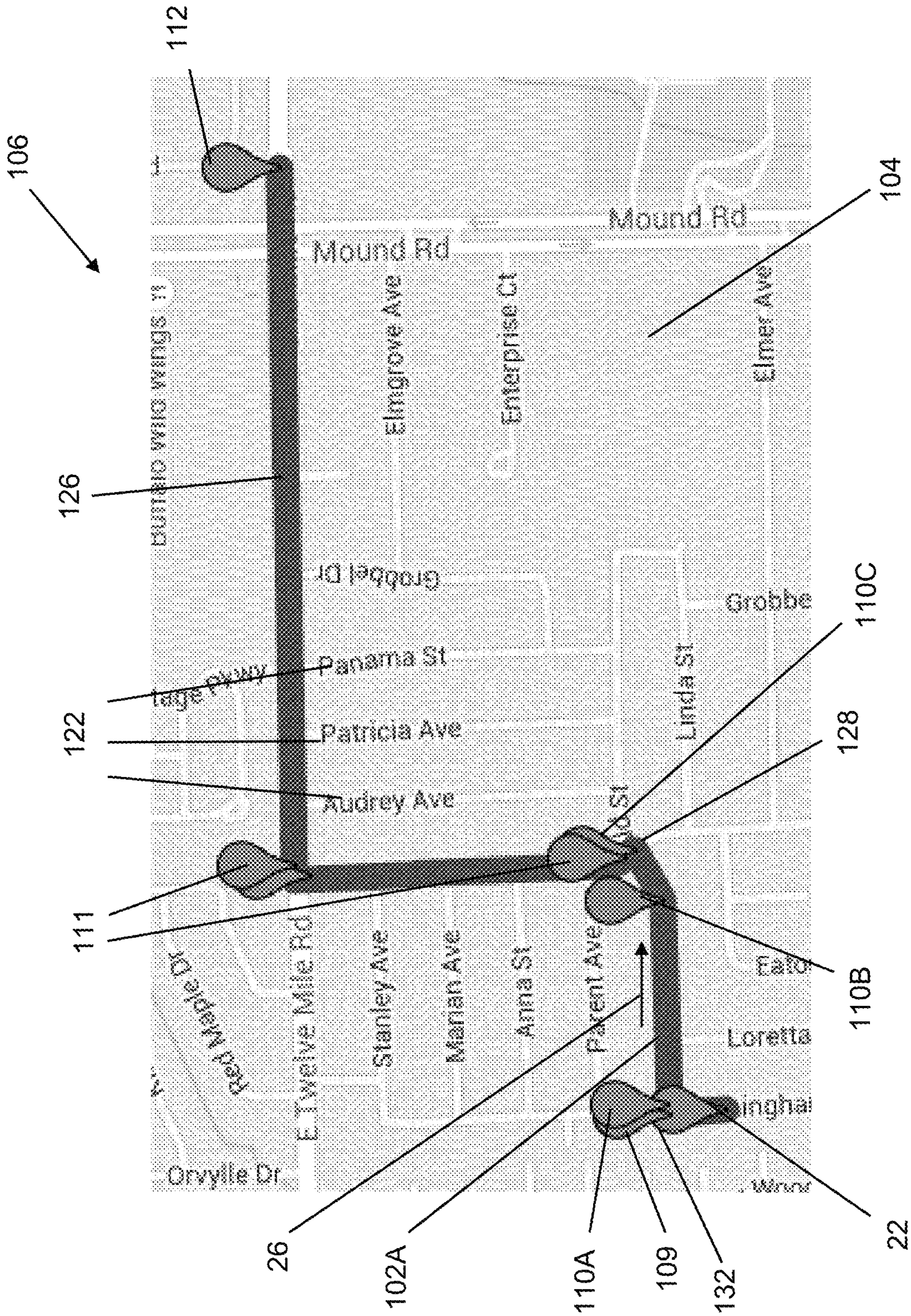
FIG. 3 depicts a path of a vehicle, according to an exemplary embodiment.

Various methods to collect and use vehicle position data will now be discussed. The vehicle components and systems discussed herein carry out these method steps. For example, FIG. 3 depicts a vehicle trip 106. This vehicle trip 106 can be stored and retrieved by the vehicle's system. In order to generate this vehicle trip 106, one exemplary method includes, first, obtaining a first position 109 of the vehicle. Second, the method includes monitoring an occurrence of a positional trigger event (e.g., a change steering element angular position). Once the positional trigger event occurs, the method includes obtaining a second position 110A of the vehicle. Both of the first and second positions (109 and 110A) are transmitted to a storage device, and both of the first and second positions form the vehicle's path 102A. The system discussed here has a vehicle system module that carries out these method steps. In particular, the vehicle system module includes the steering module configured to generate the positional trigger event and the global positioning system module configured to obtain the first and second positions of the vehicle.

In addition to the method steps above, the system also transmits and/or saves the positions obtained to a storage device. The storage device can be located on-board the vehicle (e.g., in memory 54) or it can be remote, such as at the call center 20 (e.g., in databases 84). Once the path is transmitted, the system can save it as a vehicle trip, which can be later retrieved. In one example, the vehicle trip information with the various positions of the vehicle can be saved locally, on-board the vehicle and retrieved from the vehicle system at any time for display on a vehicle display. In this example, the vehicle trip is never remotely transmitted and/or stored. In another example, the various positions forming the path can be saved locally for a set amount of time (e.g., 5 minutes). After this set amount of time, the system can transmit the positions and the path to the call center 20 for remote storage. This has the advantage of reducing the amount of calls or transmissions to the call center 20 to a set interval. Subsequently, the vehicle's on-board system can retrieve the vehicle trips from the remote storage at any time. In any of the methods described herein, the retrieved path, or vehicle trip, from the storage device can be applied to a map 104. The path, containing the various positions, is then displayed on a vehicle display 38 or similar display.

In yet another example, the vehicle system can transmit the vehicle positions and the path to the remote storage as soon as they are collected, in real-time. In this example, the vehicle system makes more calls or transmissions to the call center 20, but the vehicle trips are updated continuously so that the vehicle trip can also be retrieved and displayed, either on-board the vehicle or at a remote display, in real-time. In this exemplary method, the step of transmitting the first and second positions to a storage device includes (1) transmitting the first position to remote storage after the step of obtaining a first position and before the step of obtaining a second position and (2) transmitting the second position to the remote storage after the step of obtaining a second position.

Figure 4:
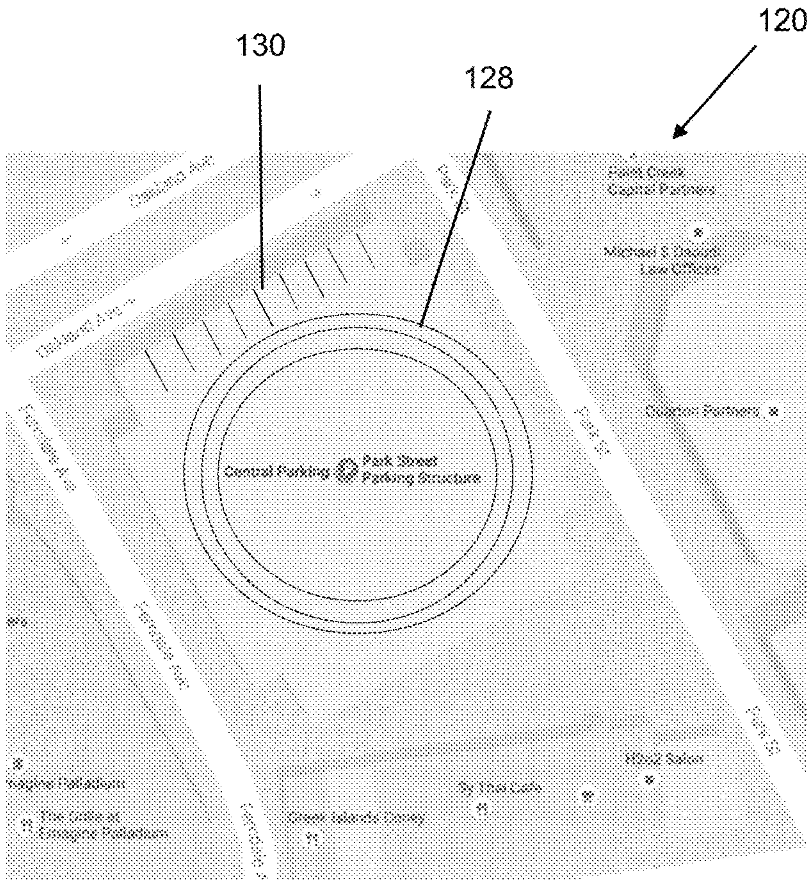
FIG. 4 depicts a parking structure for a vehicle, according to an exemplary embodiment.

As the vehicle progresses down a path, it encounters road conditions that will lead to additional positional trigger events, such as curves (FIG. 4 (128)) and corners 132. These events trigger the vehicle to collect a plurality of second positions (110B, 110C). When this happens, the method includes repeating the steps of (1) monitoring an occurrence of a positional trigger event and (2) after the occurrence of the positional trigger event, obtaining a second position to obtain the plurality of second positions of the vehicle. The path is updated to include these respective second positions.

Optionally, the first position obtained is the starting position of the vehicle when it is turned on. For example, the step of obtaining a first position comprises the first position being a starting position 22 of the vehicle when an ignition switch of the vehicle is turned on. Additionally, the method includes obtaining or collecting the last or ending position 112 of the vehicle when the ignition switch is turned off. The starting and ending positions (22, 112) do not have to relate to the occurrence of the positional trigger event, and rather relate to the vehicle's ignition switch being in an on or off position in order to obtain additional information for a complete vehicle path. If the vehicle does not encounter any positional trigger events, the method could include simply obtaining the starting and ending positions.

In any of the above described methods, the method optionally includes periodically obtaining additional positions of the vehicle without the occurrence of any positional trigger events, wherein the path includes the additional positions. For example, additional positions 111 are collected at a given periodic or time interval of about 30 seconds. After 30 seconds passes, the method includes collecting additional positions to further delineate the path 102A. These additional positions are especially helpful if the vehicle travels for a long time on a straight away section 126 of road. In some examples, if the additional positions 111 were the only collected vehicle positions, the path 102A would be hard to accurately obtain if the vehicle makes numerous quick turns on closely spaced roads (e.g., neighborhood roads 122). The periodic collection may not be often enough to obtain the most helpful vehicle positions to generate the correct path.

As the vehicle progresses from starting point 22 or first position 109 along its path 102A, the vehicle encounters various road conditions (e.g., corner 132 and/or change in vehicle speed 26) that lead to trigger events. These prompt the system to collect the second position 110A. Two vehicle positions generate path 102A. These trigger events assist in an accurate path 102A, especially if the vehicle is traveling on one of a variety of closely spaced, such as neighborhood roads 122. Optionally, when the vehicle encounters a straight away section 126 of road for a long stretch of time, the vehicle's system can take additional points 111 on a periodic interval to further delineate the path 102A. This method progresses until the vehicle is turned off at ending position 112. After obtaining the various positions, the positions can be applied to map 104 to depict the vehicle's route.

Figure 6:
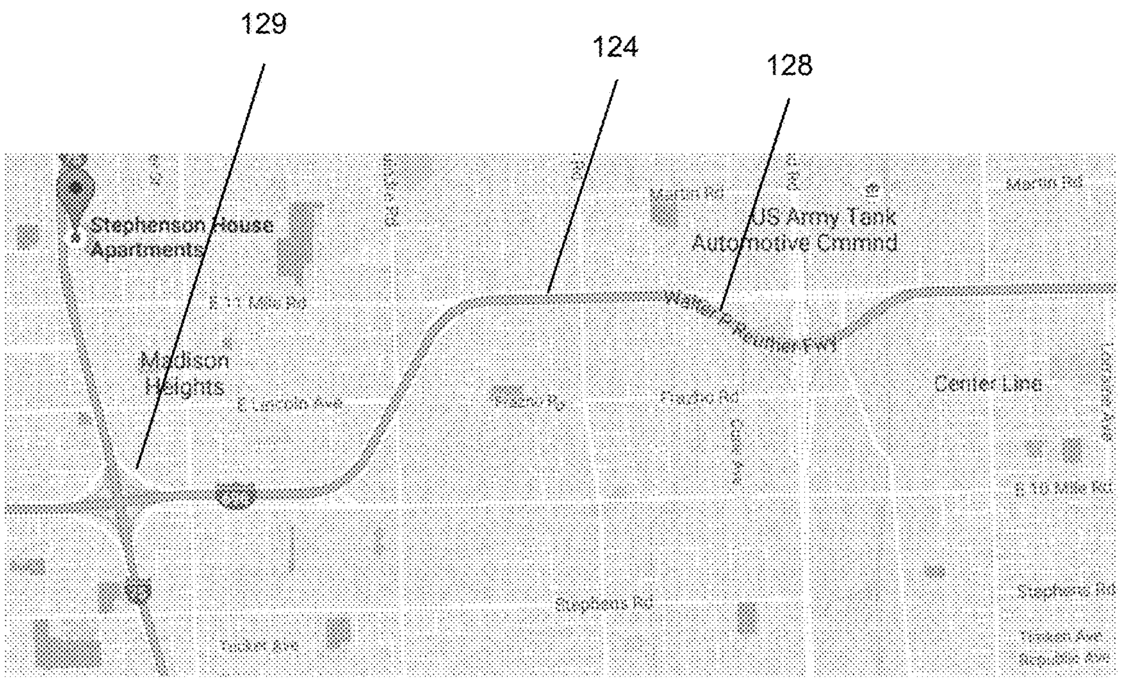
FIG. 6 depicts additional features of a path of a vehicle, according to an exemplary embodiment.
Figure 5:
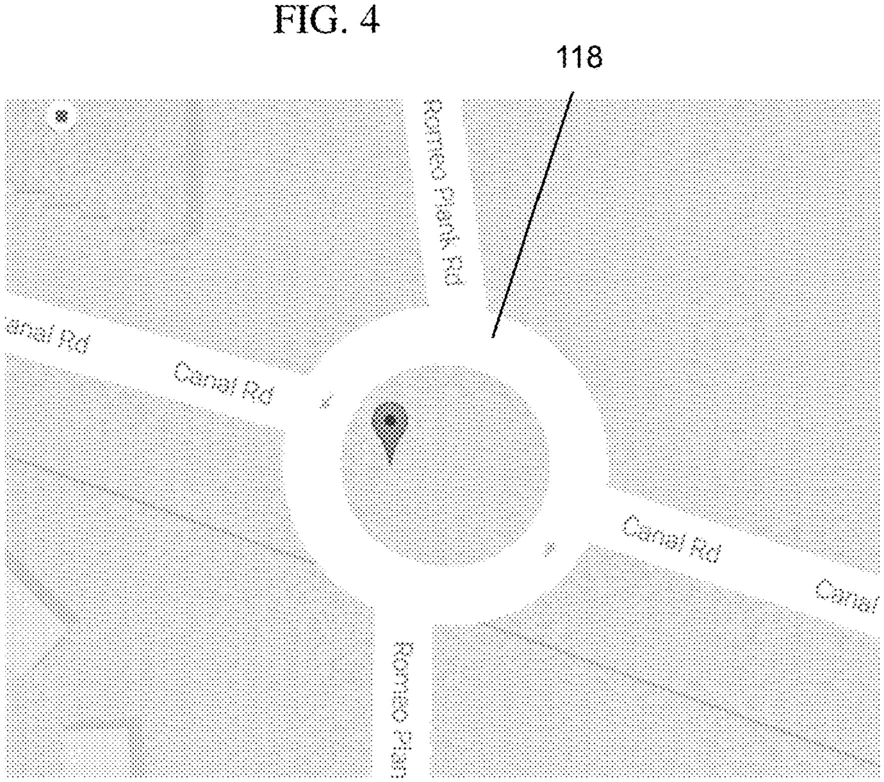
FIG. 5 depicts a roundabout for a vehicle, according to an exemplary embodiment.

FIGS. 4-6 depict additional road conditions in which the method(s) discussed herein are used. For example, FIG. 4 depicts a parking structure 120 that includes a spiral entry/exit onto a parking lot 130. Monitoring positional trigger events and obtaining second vehicle positions results in the system determining that the vehicle has entered a spiral drive with various curves 128. These turns, coupled with a change in speed, trigger the system to collect many points or positions at this time. Additionally, as the vehicle makes turns to park in one of a variety of parking spots in parking lot 130, the system also takes many positions. These same principles apply to a roundabout 118 shown in FIG. 5.

Contrastingly in FIG. 6, when the vehicle is traveling on a straight away section of a highway 124, without changing in speed and/or turning the steering element, the system obtains few or no second positions. Additionally, at high speeds without a change in speed, the system in some embodiments may determine that the curve 128 does not cause a change in any of the measured positional trigger parameters sufficient and/or significant enough to satisfy the thresholds and lead to a collection point. In other embodiments, the system may be configured to determine that curve 128 does lead to a significant change in positional trigger parameters sufficient to cause a positional trigger event for which a position data point is collected. Additionally, on-ramp 129 may lead to a significant change in two or more vehicle parameters so as to cause a positional trigger event such that another position is recorded. Without monitoring this change in the positional trigger events, the system may not be able to determine that the vehicle entered the highway 124, as opposed to following along a closely spaced surface road.

In addition to any of the described methods herein, the vehicle optionally receives, retrieves, and/or communicates a message to a vehicle occupant based on the path of the vehicle. Such communication can be a type of "tour guide" mode for the vehicle. For example, when the vehicle reaches a second position, this second position is associated with a particular location, message, event, or communication that is relevant to the vehicle occupant. At that time, the system can use its hardware (e.gs., audio system 36 or display) to communicate a message, coupon, advertisement, and the like, having audio and/or visual features, to the vehicle occupant. With accurate positional information, this communication can reach the occupant at a relevant position and/or time.

In one particular aspect, the vehicle transmits the obtained positions to a remote device, such as a cell phone (FIG. 1 (96)). Because the remote device's battery life is shorter than the vehicle's, the remote device may not be able to collect as many vehicle positions as needed for an accurate path without draining the battery. In this case, the vehicle can obtain the positions and transmit them to the remote device either (1) as soon as obtained or (2) after a given period of time. Additionally or alternatively, the vehicle can simply transmit a signal to the remote device when the vehicle system detects the occurrence of a positional trigger event so that the remote device takes its own vehicle position, or positional data point, at that time. In either the case where the system transmits the vehicle position to the remote device or the system transmits a signal to the remote device to obtain its own vehicle position, the system assists in saving the remote device's battery power.

The remote device can display the path on its display. In this example, the step of transmitting the first and second positions to a storage device includes (1) transmitting the first position or a first signal to obtain the first position to a remote device for display on the remote device after the step of obtaining a first position and before the step of obtaining a second position and (2) transmitting the second position or a second signal to obtain the second position to the remote device for display on the remote device after the step of obtaining a second position. Here, the system (1) obtains a first position of the vehicle; (2) transmits the first position or a first signal to obtain the first position to a remote device for display on the remote device; (3) monitors an occurrence of a positional trigger event; (4) after the occurrence of the positional trigger event, obtain a second position of the vehicle; and (5) transmit the second position or a second signal to obtain the second position to the remote device for display on the remote device wherein the first and second positions form the path. In this way, the remote device can display an accurate route by cooperating with the vehicle and without draining its battery life.

As introduced above, the system(s) and method(s) described herein can also be used to monitor a plurality of vehicles that are the same or different as vehicle 12. The step of obtaining a first position includes obtaining a plurality of first positions for respective vehicles in a vehicle fleet. The step of obtaining a second position includes obtaining a plurality of second positions for the respective vehicles to generate a plurality of paths for the respective vehicles in the vehicle fleet. With this example, the system communicates with a plurality of vehicles to generate a path of each respective vehicle. These paths can be applied to a map to depict where each vehicle is located and its relation to other vehicles in the fleet.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of obtaining a path of a vehicle, wherein the method is carried out by vehicle electronics of the vehicle, wherein the vehicle electronics include a global positioning satellite (GPS) module that is configured to receive one or more GPS signals from a constellation of GPS satellites, and wherein the method comprises:

obtaining a first position of the vehicle using the GPS module;

monitoring for an occurrence of a positional trigger event at the vehicle electronics, wherein the positional trigger event is based on a change in vehicle speed, a change in a steering element angular position, and a vehicle turn duration, wherein one or more thresholds are used to assess the occurrence of the positional trigger event, wherein the monitoring includes using vehicle information to convert the change in the steering element angular position to a vehicle turn radius, and wherein at least one of the one or more thresholds is dynamically adjusted based on the vehicle speed and the vehicle turn radius in an inverse relationship such that lower vehicle speeds require a greater vehicle turn radius to satisfy the positional trigger event and greater vehicle speeds require a lesser vehicle turn radius to satisfy the positional trigger event;

in response to the occurrence of the positional trigger event, obtaining a second position of the vehicle using the GPS module; and transmitting the first and second positions to a storage device, wherein the first and second positions form the path.

2. The method of claim 1, further comprising:

periodically obtaining additional positions of the vehicle without the occurrence of the positional trigger event, and wherein the path includes the additional positions.

3. The method of claim 1, further comprising:

retrieving the path from the storage device after the step of transmitting the first and second positions;

applying the path to a map; and displaying the path and the map on a vehicle display.

4. The method of claim 1, further comprising:

communicating a message for a vehicle occupant based on the path of the vehicle.

5. The method of claim 1, further comprising repeating the steps of (1) monitoring for a second occurrence of the positional trigger event and (2) in response to the second occurrence of the positional trigger event, obtaining a third position, and wherein the path includes the third position.

6. The method of claim 1, wherein the step of obtaining the first position comprises the first position being a starting position of the vehicle when an ignition switch of the vehicle is turned on, and the method further comprises:

obtaining an ending position of the vehicle when the ignition switch is turned off.

7. The method of claim 1, wherein the step of obtaining the first position includes obtaining a plurality of first positions for respective vehicles in a vehicle fleet, and the step of obtaining the second position includes obtaining a plurality of second positions for the respective vehicles to generate a plurality of paths for the respective vehicles in the vehicle fleet.

8. The method of claim 1, wherein the step of monitoring for the occurrence of the positional trigger event comprises the change in the steering element angular position being at least a 5 degree angle.

9. The method of claim 1, wherein the step of transmitting the first and second positions comprises the storage device being selected from the group consisting of a vehicle storage and a remote storage, and wherein the transmitted path defines a vehicle trip.

10. The method of claim 9, wherein the step of transmitting the first and second positions comprises the storage device being the remote storage, and the method further comprises:

retrieving the vehicle trip from the remote storage after the step of transmitting the first and second positions.

11. The method of claim 1, wherein the step of transmitting the first and second positions comprises the storage device being vehicle storage, and the method further comprises:

transmitting the path from the vehicle storage to remote storage after the step of transmitting the first and second positions.

12. The method of claim 1 wherein the step of transmitting the first and second positions to the storage device comprises (1) transmitting the first position to remote storage after the step of obtaining the first position and before the step of obtaining the second position and (2) transmitting the second position to the remote storage after the step of obtaining the second position, and the method further comprises:

displaying the path on a vehicle display, the path being in real-time.

13. The method of claim 1 wherein the step of transmitting the first and second positions to the storage device comprises (1) transmitting the first position or a first signal to obtain the first position to a remote device for display on the remote device after the step of obtaining the first position and before the step of obtaining the second position and (2) transmitting the second position or a second signal to obtain the second position to the remote device for display on the remote device after the step of obtaining the second position.

14. A system for obtaining a path of a vehicle, the system including vehicle electronics that comprise:

a global positioning satellite (GPS) module that is configured to receive one or more GPS signals from a constellation of GPS satellites, wherein the GPS module is configured to obtain a first position of the vehicle and a second position of the vehicle;

wherein the vehicle electronics are configured to:

obtain the first position of the vehicle;

monitor for an occurrence of a positional trigger event, wherein the positional trigger event is based on a change in vehicle speed, a change in a steering element angular position, and a vehicle turn duration, wherein one or more thresholds are used to assess the occurrence of the positional trigger event, wherein the monitoring includes using vehicle information to convert the change in the steering element angular position to a vehicle turn radius, and wherein at least one of the one or more thresholds is dynamically adjusted based on the vehicle speed and either or both of the change in the steering wheel angular position or the vehicle turn radius in an inverse relationship such that lower vehicle speeds require a greater change in the steering wheel angular position or vehicle turn radius to satisfy the positional trigger event and greater vehicle speeds require a lesser change in the steering wheel angular position or vehicle turn radius to satisfy the positional trigger event;

in response to the occurrence of the positional trigger event, obtain the second position of the vehicle; and transmit the first and second positions to a storage device, wherein the first and second positions form the path.

15. A system for obtaining a path of a vehicle, the system comprising:

vehicle electronics of the vehicle that are configured to:

transmit a first signal to a remote device, wherein the first signal causes the remote device to obtain a first position;

monitor for an occurrence of a positional trigger event, wherein the positional trigger event is based on a change in vehicle speed, a change in a steering element angular position, and a vehicle turn duration;

in response to the occurrence of the positional trigger event transmit a second signal to the remote device, wherein the second signal causes the remote device to obtain a second position for display on the remote device, wherein the first and second positions form the path.

16. The system of claim 15, wherein the remote device is a cellular telephone located at the vehicle.

* * * * *